United States Patent

[11] 3,601,242

| [72] | Inventors | George Horst Reinemuth<br>Clifton Heights, Pa.;<br>Mark Joseph Connor, Wilmington, Del. |
|---|---|---|
| [21] | Appl. No. | 838,875 |
| [22] | Filed | July 3, 1969 |
| [45] | Patented | Aug. 24, 1971 |
| [73] | Assignee | Gulf & Western Industrial Products<br>Company<br>Grand Rapids, Mich. |

[54] WORK TRANSFER SYSTEM
17 Claims, 7 Drawing Figs.

[52] U.S. Cl. ........................................ 198/25, 198/22
[51] Int. Cl. ........................................ B65g 47/00
[50] Field of Search ........................................ 198/25, 102, 80, 22 B, 32

[56] References Cited

UNITED STATES PATENTS

| 1,824,414 | 9/1931 | Stein | 198/25 |
| 2,359,433 | 10/1944 | McNamara | 198/25 |
| 2,827,998 | 3/1958 | Breeback | 198/25 X |
| 3,0145,574 | 12/1961 | Nussbaum | 198/22 X |
| 3,306,423 | 2/1967 | Rowlands | 198/32 |

Primary Examiner—Richard E. Aegerter
Assistant Examiner—Douglas D. Watts
Attorney—Meyer, Tilberry and Body ABSTRACT: A system utilizing endless flexible members for transferring workpieces between processing stations. The members are provided with work holders uniformly spaced throughout their length. Transfer means are arranged and related to the spacings of the work holders so that transfer can take place between members having holders at different spacings.

INVENTORS
MARK J. CONNER
GEORGE H. REINEMUTH
BY
Meyer, Tilberry & Body
ATTORNEYS.

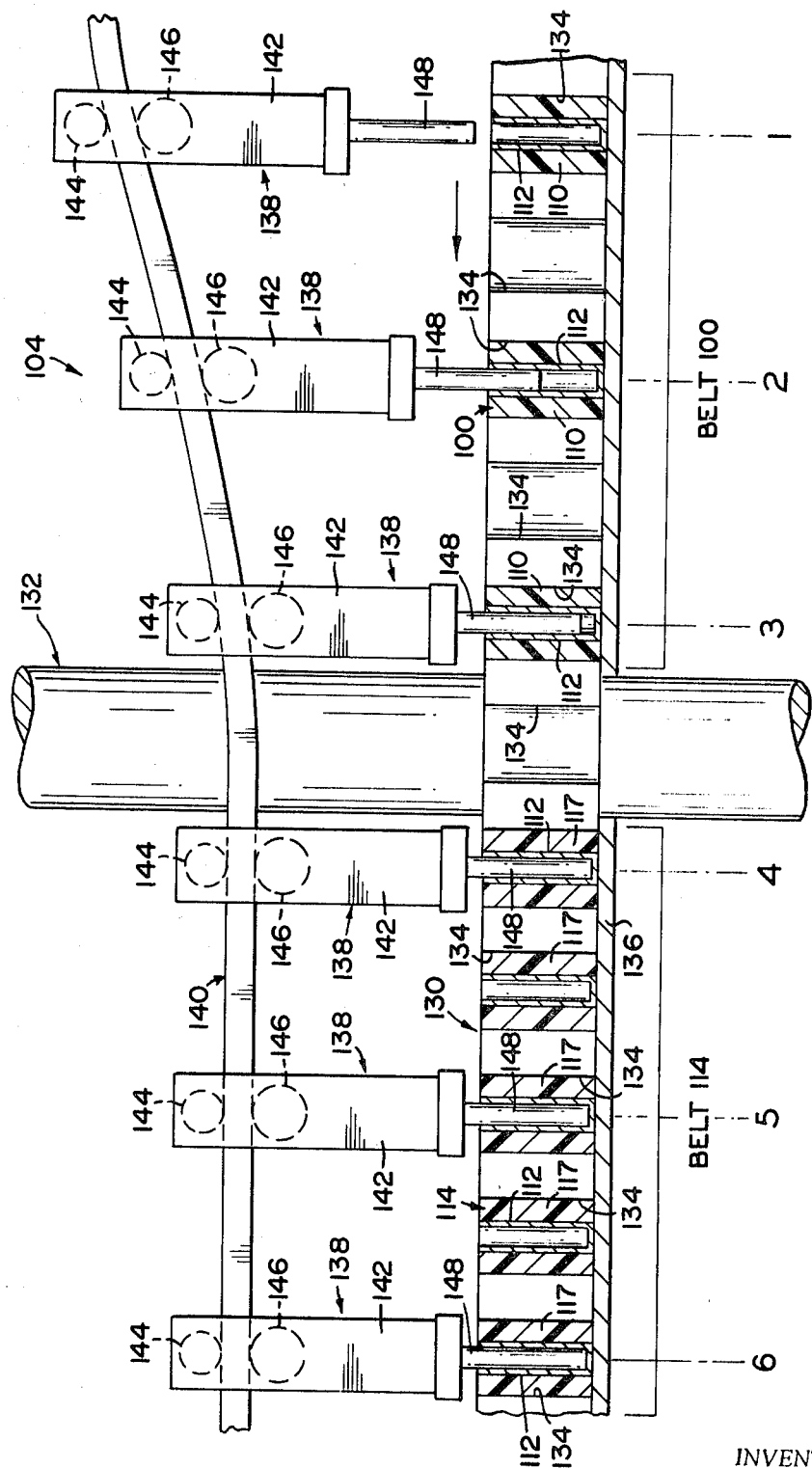

WORK TRANSFER SYSTEM

The present invention is directed toward the art of work handling and, more particularly, to a handling system wherein transfer between spaced work holders on endless flexible members is accomplished in a manner which permits the holders to have different spacings on each member.

The invention is especially suited for use in systems for processing small parts, such as cartridge casings, and will be described with particular reference thereto; however, it will be apparent that the invention is capable of broader application and could be used in other systems processing many different types of workpieces.

In the commonly assigned, copending application Ser. No. 689,935, filed Dec. 12, 1967, now U.S. Pat. No. 3,518,866, there is disclosed a cartridge casing processing system. The disclosed system uses endless flexible members having spaced work holders for conveying the cartridges between the various work stations. As can be appreciated, the most desirable spacing between the work holders varies depending upon the particular processing step being carried out. For example, the system uses rotary turret drawing presses to draw the casings to the desired length and shape. In this instance, the work holders must be relatively far apart because of the space required for the tooling. However, in subsequent processing, such as induction annealing and cleaning, greater efficiency can be achieved if the holders are more closely spaced. Still further, when performing certain processes, it is often desirable for the total time each workpiece is in the processing station to be relatively long.

With the present invention, it is a simple matter to achieve the above. The invention permits workpiece transfer to take place between work holders at different spacing. This is accomplished while maintaining complete control over the workpiece and without the use of intermediate handling or transferring equipment. Additionally, the system permits repeated passes of the same workpiece through the same processing station.

In accordance with the invention there is provided a workpiece handling and transferring system comprised of a first endless flexible member having work holders carried thereon at spaced distance L. A second endless flexible member is also provided and has work holders carried thereon and spaced apart a distance M. L is a whole multiple of M. Both the first member and the second member are trained about a rotatable turret and guide means are provided for guiding the members on the turret so that the work holders on the first member are sequentially aligned with those on the second member as the members travel about the turret. Means, preferably reciprocated rams, are provided to move workpieces from the first member to the second member when the work holders are aligned. Additionally, the second member is of a length such that with each complete revolution about the turret, different ones of the work holders are brought into alignment with the work holders on the first member.

As can be appreciated, workpieces transferred to the second member can be maintained therein for a number of revolutions determinable from the difference in holder spacings. This permits the same workpiece to be repeatedly traversed through the same work station. Additionally, it permits substantial variations in spacing of workpieces to be achieved without complex handling or transfer mechanisms.

Accordingly, a primary object of the invention is the provision of a system of the type described which permits workpiece spacing to be readily varied as the workpieces are transferred.

Still another object is the provision of a system of the general type discussed wherein workpiece transfer between the endless flexible members can be accomplished with simple reciprocated rams.

Yet another object is the provision of a workpiece transferring system wherein variation of the spacing between workpiece can be accomplished without loss of control over the workpieces.

A still further object is the provision of a transfer system of the type described which is simple to construct and operate.

These and other objects and advantages will become apparent from the following description when read in conjunction with the accompanying drawings wherein:

FIG. 4 is a sectional view taken on line 4—4 of FIG. 3;

EMBODIMENT OF FIG. 1

Figure 1:
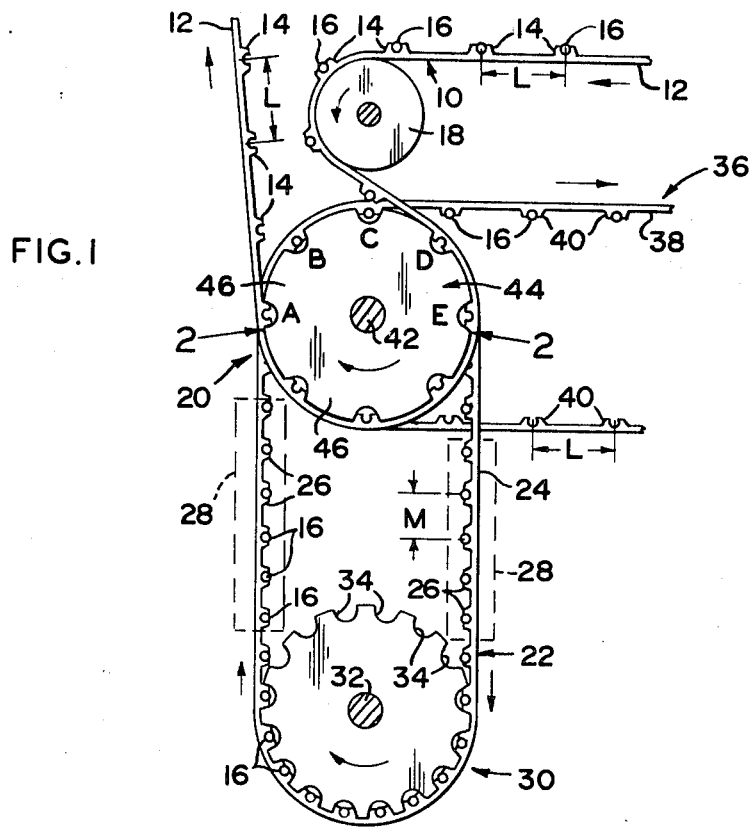
FIG. 1 is a plan view, somewhat diagrammatic, of a portion of a cartridge casing processing line showing the preferred embodiment of the invention.

Referring more particularly to the drawings, FIG. 1 shows, in plan view, a workpiece conveying member comprising first endless flexible belt member 10 which, for example, is coming from a rotary turret drawing press such as shown in the commonly assigned, copending application Ser. No. 689,935 filed Dec. 12, 1967 now U.S. Pat. No. 3,518,866. The endless flexible member 10 is preferably formed in accordance with the teachings of the noted patent application, that is, it preferably comprises an endless flexible band 12 formed from stainless steel or similar material and provided with a plurality of laterally extending clip members 14. The clip members 14 are formed from plastic or other resilient material and each clip member 14 includes a vertically extending opening sized so as to receive and resiliently grip the workpiece being transferred. In the subject embodiment, the workpieces are partially drawn cup-shaped members 16 which, after subsequent processing, will be ammunition cartridge casings. The workpiece holding members 14 are uniformly spaced along the belt 10 at distances L which, as will become apparent, can be substantially any desired distance.

In the embodiment under consideration, the belt member 10 is continuously driven through an endless orbit at a relatively high velocity. Note that the belt member 10 passes about a rotatably mounted idler pulley 18 and, thereafter, about a rotatable transfer turret assembly 20. As will subsequently be explained in detail, during its travel about the assembly 20, the workpieces 16 in the clips 14 of belt 10 are transferred to a second endless flexible belt member 22 which is continuously driven at substantially the same velocity as belt member 10 through a second endless orbit. Preferably belt member 22 is formed in the same manner as described with reference to the first belt member 10. As shown, belt member 22 includes an endless flexible band 24 of stainless steel provided with laterally extending clips 26. The clips 26 are identical to the previously mentioned clips 14; however, the clips on member 22 are uniformly spaced apart a distance M. For reasons which will hereafter become apparent, according to the invention the previously mentioned spacing L is always a whole multiple of distance M. That is, the workpieces being transferred to the rotary transfer assembly 20 are at a relatively wide spacing as dictated for example, by the tooling, etc., on the rotary drawing press from which they are being conveyed. However, in certain operations such as, for example, cleaning or annealing of the casing, it is desirable that the casings be relatively closely spaced to improve the efficiency of the operation.

In the FIG. 1 embodiment, the workpieces 16 on the belt 22 are conveyed through an induction annealing apparatus 28 shown diagrammatically. As will be noted, the belt member 22 is guided through its orbit by being trained about the rotary transfer assembly 22 and a sprocket or pulley member 30 which is mounted for rotation about a vertical shaft 32. As shown, the pulley or sprocket 30 has recesses 34 formed in its outer periphery. The recesses 34 are sized and arranged so as to closely receive the workpiece holding members 14 in the manner of a positive drive belt.

As the belt 22 passes about the transfer turret assembly 20, certain ones of the workpieces 16 are transferred to a third endless flexible belt member 36 which, like the members 10 and 22 are guided through an endless orbital path and comprises an endless flexible band 38 provided with workpiece holding clips 40. The workpiece holding clips 40 are preferably identical to clips 14 and 26 but are each spaced apart a distance L as are those on belt 10. Normally, the workpieces 16 are thereafter conveyed by belt 40 to a second processing unit such as a final draw press which removes the workpieces from clips 40 and elongates them to a size closer to the final cartridge size. After passing about the subsequent processing station, the belt 36 returns about the transfer turret 20 to have its clips 40 refilled with the blanks 16.

Figure 2:
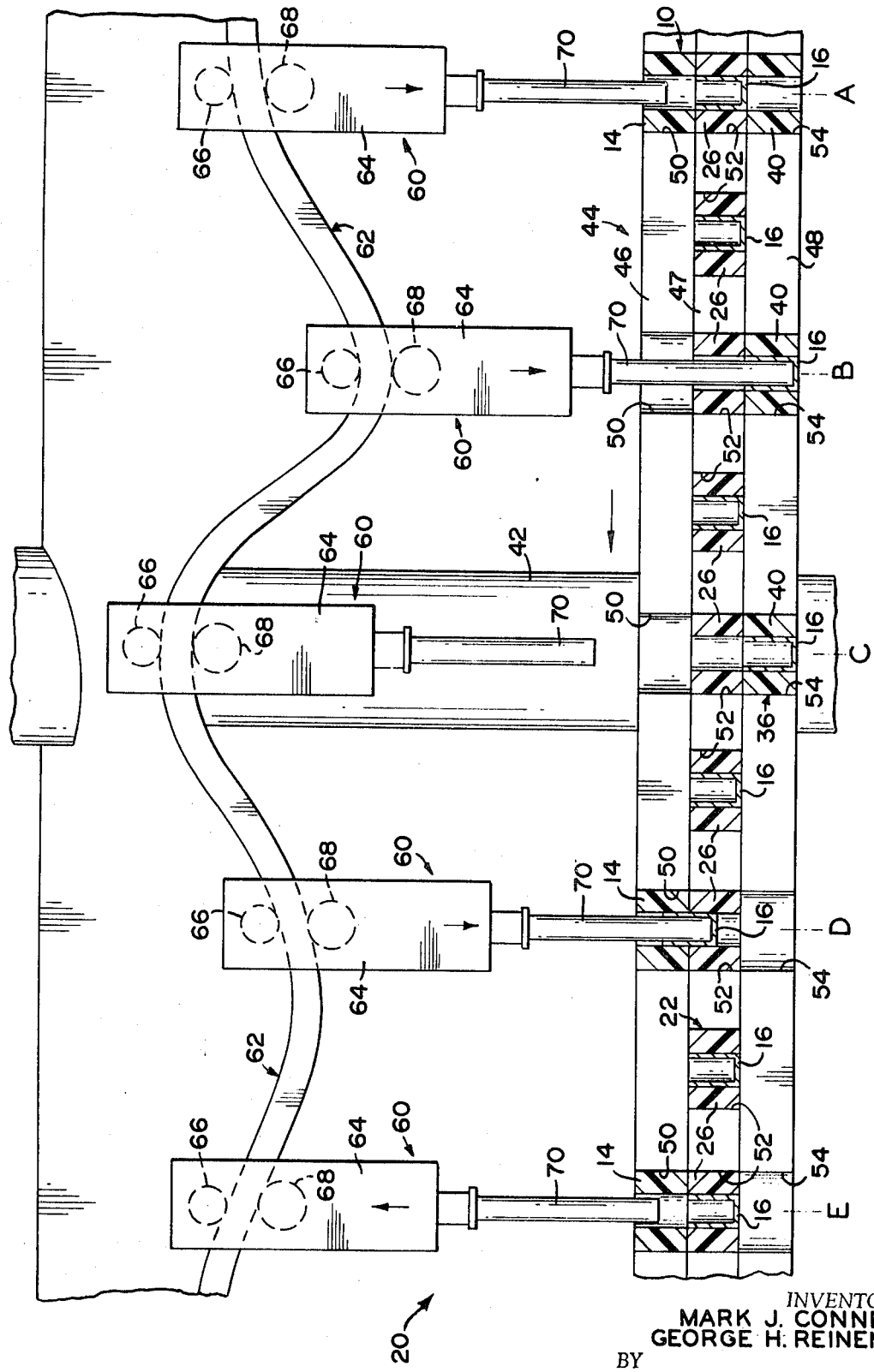
FIG. 2 is a sectional view taken on line 2—2 of FIG. 1 and showing transfer taking place between various workpiece transferring members.

The manner in which the transfer is accomplished between belts 10, 22, and 36 to permit spacing of the workpieces in the belt 22 to be closer together than the spacing of belts 10 and 36 can best be understood by reference to FIG. 2. Referring to FIG. 2 it will be noted that the rotary turret transferring assembly 20 includes a vertically extending main support shaft 42. Carried by the support 42 and rotatable relative thereto is a turret member 44. Although the turret member 44 could be of a variety of constructions, it is shown as being comprised of three separate horizontally extending plate members 46, 47 and 48. The plate members 46–48 are interconnected such as by vertically extending bolts (not shown) so that they all partake of simultaneous rotation. The top plate member 46 is of circular configuration and has recesses 50 formed in its outer periphery. As shown in FIG. 1, the recesses 50 are spaced a circumferential distance apart equal to the spacing of the workpiece holders 14 of the belt 10. Additionally, the recesses are sized so as to closely receive the holders 14.

The plate member 47 is preferably of a diameter identical to the plate member 46. This plate has recesses 52 formed about its outer periphery. It will be understood that the recesses 52 are spaced a circumferential distance apart corresponding to the spacing M of the holders on the belt member 22. Additionally, the recesses 52 are sized to closely receive the workpiece receiving or holding clips 26. Referring to FIG. 2 it will be noted that alternate ones of the recesses 52 are in vertical alignment with the recesses 50 on plate member 46.

In the subject embodiment, the plate member 48 is identical to the plate member 46. Note that it is provided with recesses 54 which are spaced apart a circumferential distance L and arranged to closely receive the workpiece clips 40 on the belt 36.

Mounted above the turret member 44 and arranged for simultaneous rotation therewith are a plurality of ram members 60. The ram members 60 are carried in a rotatable turret (not shown) such as in the manner described in the commonly assigned, copending application Ser. No. 575,387 filed Aug. 26, 1966. The rams are arranged to rotate with the turret 44 while being simultaneously reciprocated through desired vertical paths by a stationary circular cam member 62. It will be noted that each of the ram members 60 include a slide member 64 which is carried in vertical guideways formed in the turret member not shown. Pairs of cam follower rollers 66 and 68 extend outwardly from the slide members 64 for engagement with the cam 62.

Extending downwardly from each of the slides 64 and preferably releasably connected thereto, is a cylindrical punch member 70. The punch members 70 are arranged so as to be capable of freely moving within the center opening of the cup-shaped workpieces 16. Additionally, it should be noted from FIG. 2 that one of the ram assemblies 60 is provided above and aligned with each of the recesses 50 of plate member 46. The rams are arranged so that they are axially aligned with the workpieces of the various clips in the belts 10 and 36 as the clips pass about the rotary turret assembly 20.

OPERATION OF FIG. 1 EMBODIMENT

The operation of the apparatus thus far described will now be explained. Referring to FIG. 1, note that as the belt 22 enters into engagement with the rotary turret transfer assembly 20, each of its workpiece holding members 26 contains a cup-shaped workpiece 16. At position A, alternate ones of the clips are received in the recesses 52 which are in alignment with the punch 70 and recesses 50 and 54 of the disc members 46 and 48 respectively. At position A the cam is arranged so that the punch is just beginning to move downwardly and enter the opening in the workpiece receiving clip 14 of belt 10 which is, at this time, just beginning to leave the turret empty as can be seen from FIG. 1. As the turret assembly 20 rotates from position A to position B, the cam 62 is contoured to cause the punch 70 to move downwardly to engage the workpiece 16 in the clip of belt 22 and drive it downwardly into the aligned clip 40 of belt member 36. Thus, the workpieces in alternate clips of belt 22 are transferred to the clips of belt 36.

During rotation from position B to position C, the cam 62 acts to retract the punch 70 to an upper position spaced from the turret 44. As best shown in FIG. 1, between positions C and D the belt 10 is coming onto the turret filled with workpieces. From position C to position D, the ram begins to again move downwardly and acts to force the workpieces from the clips of belt 10 into the recently emptied clips of the belt 22. Thereafter, from position D to position E, the ram retracts up to a position spaced above the turret 44. As can be appreciated, during each revolution about the rotary transfer assembly, alternate ones of the workpieces in belt 22 are transferred to the lower belt 38. Additionally, during the same passage about the turret assembly 20, workpieces from belt 10 are transferred to the emptied clips of belt 22.

By regulating the number of clips on the belt 22, each successive pass about the turret 44 brings different ones of the clips 26 into alignment with the rams 16. In the embodiment of FIGS. 1 and 2, since the spacing M is one half of L, each workpiece transferred to belt 22 remains in the belt for two passes about the transfer assembly 20. Obviously, by varying the relative spacings L and M it is possible to achieve substantially any desired spacing variation so long as L is a whole multiple of M. Additionally, with variation in the spacing relationship the number of revolutions which each workpiece must travel about its orbital path is varied.

The above-described arrangement offers many obvious advantages. For example, in cleaning and annealing operations a substantial time is required for the workpieces to be properly treated. This time could, of course, be achieved merely by greatly increasing the length of the run through the cleaning or annealing apparatus. However, considering the speed at which the belt is moving, with the workpieces spaced apart the distance required by the previous operation, such as for example, the drawing operation, the efficiency of the cleaning or annealing drops off considerably. Additionally, the devices must be extremely long to provide the necessary time for treatment.

The invention permits various other advantages to be obtained. For example, assume that the sprocket or pulley 30 were a machining or treating turret where, for example, it were desired to perform two separate machining operations e.g., drill a firing pin hole and taper the neck of the cartridge blank. By placing the necessary tools in alternate locations about the turret the first pass of a workpiece through the turret would bring it into alignment with the drilling tooling, whereas, the second pass through the turret would bring it into alignment with the tapering tooling. Thus, a single turret could be used for performing multiple functions on the same workpiece.

THE EMBODIMENT OF FIG. 3

Figure 3:
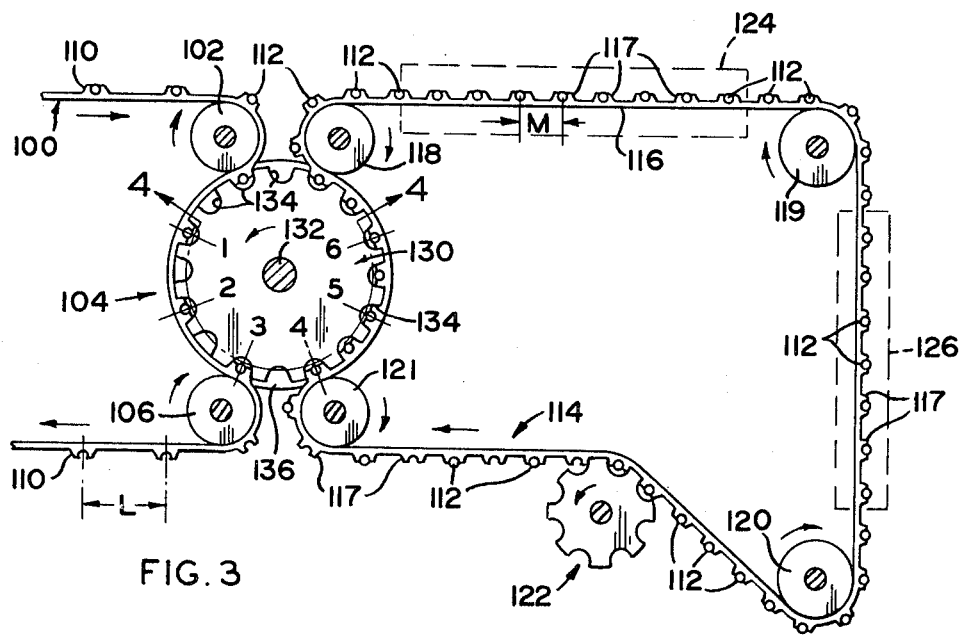
FIG. 3 is a plan view, somewhat diagrammatic, showing a modified form of the invention.

FIGS. 3 and 4 show a second embodiment of the invention which also permits the spacing of the workpieces on two belts to be varied during a belt-to-belt transfer. Additionally, the FIGS. 3 and 4 embodiment permits the plane of the orbital paths of both of the belts to be the same. Referring in particular to FIG. 3, a first endless flexible belt member 100 is shown passing about a first idler pulley 102, a rotary transfer turret 104 and a second idler pulley 106. The belt 100 is formed preferably in the same manner as described with reference to belt 10 of the FIG. 1 embodiment, that is, it includes an endless flexible band of stainless steel 108 provided with spaced workpiece holding clips 110. In the FIG. 3 embodiment, the workpiece clips 110 are spaced apart a distance L. During passage about the rotary turret assembly 104, the workpieces 112 in belt 100 are removed from the belt and transferred to the belt 114 which is simultaneously passing about the diagonally opposite side of the rotary turret assembly 104.

The belt 114 is similar to the previously described belt 22 and includes an endless flexible band 116 carrying workpiece receiving members 118 spaced thereon at distances M. The belt 114 is guided throughout its endless orbital path by four idler pulleys 118 through 121. Positioned along the lower most run of belt 114 (as viewed in FIG. 3) is a turret assembly 122 which is arranged to remove alternate ones of the workpieces from belt 114. On the upper and right-hand runs of the belt 114 (as viewed in FIG. 3) induction annealing devices 124 and 126 are shown diagrammatically.

Referring to FIG. 4, it will be seen that the rotary turret transfer apparatus 104 comprises a main turret member 130 which is mounted for rotation about a vertically extending support shaft 132 (See FIG. 3). The rotary turret member 130 is continuously driven by the passage of the belts thereover or, alternately, is provided with an independent drive means which causes the member 130 to drive the belts 100 and 114. The outer periphery of the rotary turret member 130 is provided with spaced inwardly extending recesses 134. The recesses 134 are sized so as to receive the workpiece holding clips or members 110 and 118. Additionally, the recesses 134 are spaced to correspond to the spacing M of the clips 118 of belt 114.

For reasons which will hereafter become apparent, a flange or base member 136 extends outwardly from the lower surface of the turret member 130. This flange 136, in effect, provides a closure for the lower end of the recesses 134.

A plurality of ram members 138 are carried by a separate rotary turret (not shown) mounted above and rotatable simultaneously with the turret member 130. As previously described with reference to ram assembly 60 of the FIG. 1 embodiment, each of the ram assemblies 138 is arranged for guided vertical movement during rotation of the rotary turret transfer assembly 104. The ram assemblies 138 are driven through a desired vertical reciprocation by a stationary circular cam 140. As shown, each of the ram assemblies 138 include a slide member 142 provided with outwardly extending cam follower rollers 144,146 which engage opposite sides of the cam 140. Ram or punch members 148 extend downwardly from each of the slides 142. As can be seen, the punches 148 are each aligned with alternate ones of the recesses 134. The punches are arranged and sized so as to be capable of entering into the center bore of a cup shaped cartridge casing blank 112 when it is in a clip in the recesses 134.

OPERATION OF THE FIG. 3 EMBODIMENT

The transfer function which takes place in the transfer turret 104 is apparent from FIG. 4. As can be seen, as the belt 100 moves onto the turret 130 and approaches the position labeled 1 in FIG. 3, the associated punch assembly 138 is cammed downwardly as the turret rotates. As the turret rotates to move through position 2 the punch 148 enters the subjacent cartridge casing blank 112. During rotation from position 2 to position 3 the ram 148 continues to be moved downwardly until, between positions 3 and 4, it is engaged with the bottom wall of the blank and presses it tightly against the outwardly extending flange 136. As the turret 130 rotates through position 3, the belt 100 is pulled away from the turret and passes about the idler pulley 106. At this time the ram is within the interior above the cartridge blank 112. As the belt passes away from the turret 130 the resilient clip is pulled laterally from the workpiece 112, the workpiece being maintained in its same location by the ram. The ram thereafter moves down engaging the bottom of the blank 112 and holding it firmly against the flange 136.

Referring again to FIG. 3, it will be noted that the incoming or lower run of the belt 114 has alternate clips or holders 118 empty. As these clips pass about the idler pulley 121, they are brought into engagement with the cartridge blanks being held by the rams 148. The clips engage the blanks in the manner of mating gears and grip the blank. Thus, at station 4, the casings 112 are completely within the clips 118. Thereafter, the rams can be maintained in a lowered position as shown in FIG. 4 at locations 5 and 6 or, alternately, the rams can be immediately retracted to an upper position.

With the casings firmly gripped by the holders 118, the belt is withdrawn from the turret 130 and trained about the idler pulley 118 and through the annealing apparatus 124 and 126. As the belt passes over 120 it comes into engagement with the discharge turret 122 wherein alternate ones of the workpieces are removed. Although the details of turret 122 are not shown it should be understood that this turret can be a simple cam operated ram assembly which forces the workpieces out of the belt into a subjacent hopper or, even to a subjacent belt which conveys them to a subsequent processing operation.

By properly relating the total number of clips on belt 114 to the clip spacing, each orbit of the belt 114 about its total orbital path will bring alternate ones of the clips into alignment with the rams on the transfer turret 104. Thus, each workpiece placed in the belt 114 will remain therein for approximately two revolutions about the path i.e., two revolutions less the distance between the transfer turret 104 and the discharge turret 122.

As can be appreciated, although in the FIG. 3 embodiment the L spacing is twice as great as the M spacing, the two spacings could have many different relationships provided that L is a whole multiple of M. Additionally, although the apparatus is shown as operating in a horizontal plane, the physical orientation of either of the FIGS. 1 and 2 embodiment, or the FIGS. 3 and 4 embodiment, can be varied to suit the needs of any particular installation.

THE FIG. 5 EMBODIMENT

Figure 5:
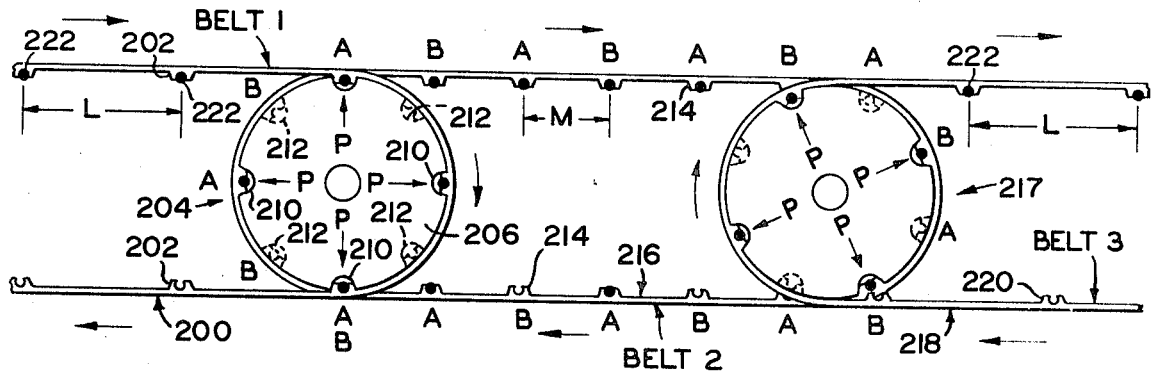
FIG. 5 is a diagrammatic plan view of a third embodiment of the invention which is especially suited for showing the desired dimensional and positional relationships required for practicing the invention.

FIG. 5 shows a third modification of the invention. The FIG. 5 modification can be used in the manner of either of the FIG. 1 or the FIG. 3 embodiment. That is, it can act to transfer between the various workpiece holders by direct axial actuation which is done in the FIG. 1 embodiment or, alternately, by the lateral removal and reinsertion as is accomplished in the FIG. 3 embodiment.

Figure 6A:
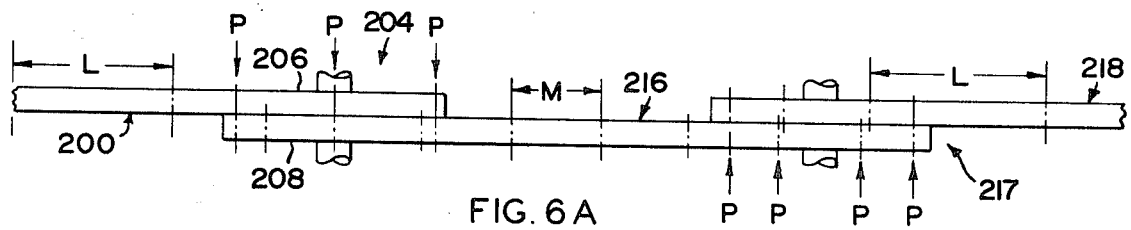
FIG. 6A is a side elevation of the FIG. 5 embodiment.

Specifically, the FIG. 5 apparatus includes a first endless flexible belt member 200 provided with clips 202 spaced therealong at distances L. The belt 200 is preferably constructed in the same manner as the previously mentioned belts. As shown in FIG. 5 and 6A, the belt 200 passes about a rotatably mounted transfer turret 204 comprised of two disc members 206 and 208. The disc member 206 includes peripheral recesses 210 which are spaced so as to receive the clip members 202 on the belt 200. The lower turret member 208 is likewise provided with recesses 212 which receive a clip member 214 on the transfer belt 216. The recesses 212 are spaced apart a distance M corresponding to the spacing between the clips 214 of belt 216. Additionally, it will be noted that the distance L is a whole multiple of the distance M. Accordingly, corresponding ones of the recesses 210 and 212 are in vertical alignment on the turrets.

A second transfer turret 217 is also provided. This turret is identical in construction to the turret 204 and is arranged so that the belt 216 passes about the lower disc and a third belt member 218 passes about the upper disc. The work holders 220 on belt 218 are spaced apart a distance L. Additionally, the recesses in the two disc of the transfer turret 217 are arranged so that as the belts 218 and 216 pass thereover each one of the clips 220 is aligned with one of the clips on the belt 216.

Both of the turrets 204 and 217 are provided with vertically reciprocated punch members constructed and operated generally in the manner described with reference to the FIGS. 1 and 3 embodiments. The location of the punch members on the turrets 204 and 217 are identified by the letters P.

OPERATION OF THE FIG. 5 EMBODIMENT

Assume that a workpiece 222 is being delivered to the turret 204 by the belt 200. As the workpiece enters the 12 o'clock position on the turret 204, the punch at that location is actuated downwardly to engage the workpiece and begin moving it downwardly in the corresponding clip 202. As the turret rotates to the 6 o'clock position the workpiece has been moved partially out of the clip 202 and an empty incoming clip 214 on the belt 216 laterally engages the lower portion of the workpiece. Continued rotation to the 9 o'clock position causes the ram to continue moving downwardly forcing the workpiece entirely into the clip on belt 216. Thereafter, the workpiece 222 is entirely in the clip on belt 216 and the ram moves back to an upper position ready for another downstroke at the 12 o'clock position.

Figure 6B:
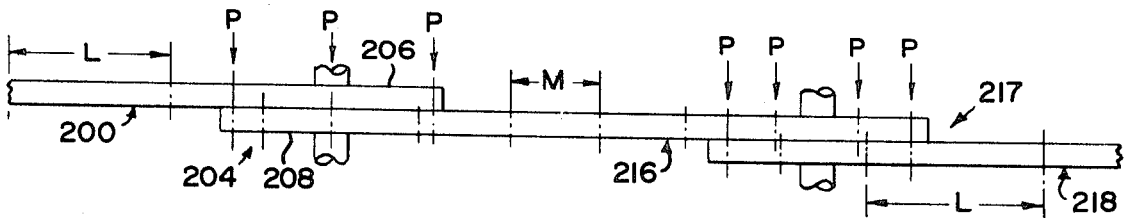
FIG. 6B is a side elevation of a modified form of the FIG. 5 embodiment.

Note that the clips on belt 216 into which a workpiece has been inserted during a first passage of the belt over the turret 204 are labeled positions A. As the belt 214 passes about the turret 217, the workpieces in position A are at locations between punches. It will be noted from FIG. 6A that the punches are actuated upwardly in this embodiment. Note that the B clips are engaged by the punches and the workpiece carried therein moved upwardly until at nearly the 6 o'clock position the workpiece is halfway out of the clip and is received on an incoming clip on belt 218. Between the 6 o'clock and 8 o'clock position the workpieces move entirely up into the clips of belt 218 and the punch retracted for another upward movement as the 12 o'clock position is approached. During each succeeding revolution of the belt about the two turrets alternate ones of the clips are emptied in turret 217 and again filled in turret 204. This can be readily appreciated by the alternate A and B identification of the clips on belt 216. Note that the clip at the 6 o'clock position of turret 204 is labeled B and as the complete circuit of the belt is made the same clip is, at the next passage, an A clip. Thus, during each successive rotation the clips are, in effect, moved one notch on the turret. By varying the relationship of spacings L and M and modifying the number of holders, any desired spacing or number of passes of the workpieces about the two turrets can be achieved. Additionally, rather than use an upward punch actuation on turret 217, the punches can be actuated downwardly as shown in FIG. 6B. This merely requires that the belt 218 be positioned beneath the belt 216. Additionally, although the FIG. 5 embodiment has been described with a modified lateral and then axial insertion of the workpieces from belt-to-belt, it would, of course, be possible to use an entirely lateral transfer in the manner shown in the FIG. 3 embodiment. This could be accomplished merely by providing a lower flange on the turret (such as the flange 136 on the turret 130 of the FIG. 3 embodiment) and varying the rate of ram actuation. Likewise, by providing a portion of overlap between the belts trained about the turrets, direct axial transfer between belts can be achieved in the manner of the FIG. 1 embodiment.

Although the invention has been described in detail with regard to certain specific embodiments, it should be apparent that many variations and modifications are possible. For example, the means for moving the workpieces between the workholders on the belts have been shown as cam operated rams, the means could obviously be of many types such as air or solenoid operated plungers, or even gripping chucks. Further, the orientation of the system clearly does not have to be horizontal as shown. The fact that the workpieces are always positively gripped throughout the transfer permits the system to have nearly any orientation. Likewise, although the belts have been shown as traveling through orbits lying in parallel planes, depending upon the flexibility of the belts or other endless flexible members used, they can be guided through nonparallel and even curved planes.

We claim:
1. A work transfer system comprising:
   a first endless series of work holder means spaced apart a distance M;
   a second endless series of work holder means spaced apart a distance L which is a whole multiple of distance M;
   guide means for guiding said first and second series of work holder means through separate endless orbital paths at substantially the same linear velocity;
   transfer means movable with both said first and said second series of work holder means throughout at least portions of their respective paths for engaging and removing workpieces in said second series of work holder means while maintaining their spacing L and transferring them to the first series of work holder means;
   said first series of work holder means being of a total length such that with each succeeding orbit of said first series of work holder means workpieces are transferred to different ones of said first series of work holder means.

2. The invention as defined in claim 1 wherein said guide means guide said first and said second series of work holder means through orbits which lie in parallel planes.

3. A work system comprising:
   a first endless series of work holder means spaced apart a distance M;
   a second endless series of work holder means spaced apart a distance L which is a whole multiple of distance M;
   guide means for guiding said first and second series of work holder means through separate endless orbital paths at substantially the same linear velocity;
   transfer means movable with both said first and said second series of work holder means throughout at least portions of their respective paths for engaging and removing workpieces in said second series of work holder means while maintaining their spacing L and transferring them to the first series of work holder means;
   said first series of work holder means being of a total length such that with each succeeding orbit of said first series of work holder means workpieces are transferred to different ones of said first series of work holder means;
   said guide means guiding said first and said second series of work holder means through orbits which overlap throughout at least a portion of the orbits thereof.

4. The invention as defined in claim 1 wherein said guide means include a rotatable turret means about a portion of which both said first and said second series of work holder means are guided during movement through their respective orbits.

5. The invention as defined in claim 1 wherein said guide means guides said first and said second series of work holder means through orbits which lie in the same plane.

6. The invention as defined in claim 5 wherein said guide means guides each of said series of work holder means through orbits which throughout at least a portion constitute a part of an imaginary circle.

7. The invention as defined in claim 1 wherein each of said work holder means comprises an endless flexible member provided with work holders in the form of resilient clip members.

8. A workpiece handling system comprising:

a first endless flexible member having workpiece holding means carried thereon at spaced distances M;

a second endless flexible member having workpiece holding means carried thereon at spaced distances L which is a whole multiple of M;

guide means for guiding said members through separate orbits, said guide means including a turret about which both said first and said second endless flexible members are trained;

means for guiding said members on said turret so that the workpiece holding means on said second member are sequentially aligned with those on said first member as said members travel about said turret;

means associated with said turret for moving workpieces from said second member to said first member when said holding means are aligned; and, said first member having a number of holding means thereon chosen so that with each complete revolution of said first endless flexible member, different ones of said holding means on said first endless flexible member are brought into alignment with the holding means on said second member.

9. The invention as defined in claim 8 wherein said means for moving said workpieces from said first to said second member comprise rams carried by said turret and rotatable therewith.

10. The invention ad defined in claim 8 wherein said workpiece holding means comprise resilient clip members.

11. The invention as defined in claim 8 wherein said first and sand second endless flexible members are constrained by said guide means to travel in orbits lying in parallel planes.

12. A work transfer system comprising:
two endless flexible belt members;
means for guiding the members through separate orbits which overlap throughout at least a portion of their extent;
work holders carried on both of said belt members;
the holders on the first belt member being spaced a distance L and the holders on the second belt member being spaced a distance M, L being a whole multiple of M; and,
first means movable with said first and second belt members throughout said overlapping portion of their orbits for transferring workpieces from the holders on the first belt member to the holders on the second belt member during the time the holders are passing through the overlapping portions of the orbits.

13. The system as defined in claim 12 wherein the holders are resilient clip members extending laterally from said belt members.

14. The system as defined in claim 12 wherein said belt members are each trained about a common turret.

15. The system as defined in claim 12 including a third endless flexible belt member and means for guiding said third endless flexible belt member through an orbit which overlaps at least a portion of the orbit of said second endless flexible belt member.

16. The system as described in claim 15 wherein said first means for transferring workpieces is operable to transfer workpiece from said second endless flexible belt member to said third flexible belt member.

17. The system as described in claim 15 including second means for transferring workpieces from said second endless flexible belt member to said third endless flexible belt member.